(12) United States Patent
Kayashima et al.

(10) Patent No.: US 7,519,184 B2
(45) Date of Patent: Apr. 14, 2009

(54) WIRELESS COMMUNICATION SYSTEM

(75) Inventors: Naoshi Kayashima, Yokohama (JP); Yuuji Nagano, Yokohama (JP); Yuji Nomura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 853 days.

(21) Appl. No.: 10/951,744

(22) Filed: Sep. 28, 2004

(65) Prior Publication Data

US 2005/0201564 A1    Sep. 15, 2005

(30) Foreign Application Priority Data

Mar. 9, 2004    (JP) .............................. 2004-064922

(51) Int. Cl.
*H04L 9/00*    (2006.01)

(52) U.S. Cl. ...................... 380/283; 380/270; 380/273; 380/277; 380/201; 380/255; 713/163; 713/169; 713/150; 713/168; 726/6; 726/15

(58) Field of Classification Search .................. 380/283
See application file for complete search history.

(56) References Cited

U.S. PATENT DOCUMENTS

| 5,915,025 | A  | * | 6/1999 | Taguchi et al. ................ 380/44 |
| 6,157,722 | A  | * | 12/2000 | Lerner et al. ................ 380/260 |
| 6,157,723 | A  | * | 12/2000 | Schultz ........................ 380/273 |
| 6,711,267 | B1 | * | 3/2004 | Kirjavainen ................ 381/71.1 |
| 7,024,553 | B1 | * | 4/2006 | Morimoto .................... 713/163 |
| 7,065,643 | B1 | * | 6/2006 | Cornils et al. ............... 713/163 |
| 7,133,526 | B2 | * | 11/2006 | Whelan et al. ............... 380/270 |
| 7,269,409 | B2 | * | 9/2007 | Suzuki et al. ................ 455/411 |
| 2002/0069357 | A1 | * | 6/2002 | Kilkkila ....................... 713/169 |
| 2004/0044891 | A1 | * | 3/2004 | Hanzlik et al. .............. 713/150 |
| 2004/0109566 | A1 | * | 6/2004 | Yamamoto .................. 380/270 |
| 2004/0139320 | A1 | * | 7/2004 | Shinohara ................... 713/168 |
| 2005/0226420 | A1 | * | 10/2005 | Makela et al. ............... 380/270 |
| 2007/0172064 | A1 | * | 7/2007 | Nonaka et al. .............. 380/258 |

FOREIGN PATENT DOCUMENTS

| JP | 2001-111543 | 4/2001 |
| JP | 2003-005641 | 1/2003 |
| JP | 2003-258790 | 9/2003 |

* cited by examiner

*Primary Examiner*—Kambiz Zand
*Assistant Examiner*—Yonas Bayou
(74) *Attorney, Agent, or Firm*—Fujitsu Patent Center

(57) ABSTRACT

A small-scale wireless communication system offering advanced security level. An encryption key memory of an access point stores an encryption key list of a plurality of different encryption keys. A change information transmitter periodically transmits change information to a terminal by radio, the change information requesting the change of encryption key. An encryption key selector selects an encryption key from the encryption key list under a rule when the change information transmitter transmits the change information. A terminal-side encryption key memory of the terminal stores a terminal-side encryption key list which is the same as the encryption key list. A change information receiver receives the change information from the access point. Upon reception of the change information, a terminal-side encryption key selector selects an encryption key from the terminal-side encryption key list under a rule which is the same as the rule which the encryption key selector used to select the encryption key.

9 Claims, 15 Drawing Sheets

12a ENCRYPTION KEY LIST

ENCRYPTION KEY A1

ENCRYPTION KEY A2

ENCRYPTION KEY A3

ENCRYPTION KEY A4

ENCRYPTION KEY A5

ENCRYPTION KEY A6

WIRELESS COMMUNICATION SYSTEM

CROSS-REFERENCE TO RELATED APPLICATIONS

This application is based upon and claims priority of Japanese Patent Application No. 2004-064922, filed on Mar. 9, 2004, the contents being incorporated herein by reference.

BACKGROUND OF THE INVENTION (1) Field of the Invention

This invention relates to a wireless communication system and, more particularly, to a wireless communication system in which communication data is encrypted and decrypted with an encryption key.

(2) Description of the Related Art

Recently, data is often communicated between electric devices in wireless Local Area Networks (LAN). Some wireless LANs are composed of client terminals such as personal computers with a wireless communication function and access points for connecting the client terminals to wired LANs by communicating with the client terminals by radio. The client terminals communicate with each other by radio, and are connected to wired LANs via the access points by radio. The access points are connected to each other, via wired LANs with the infrastructure method or via wireless LANs with the wireless distribution system.

In the wireless communication, data should be made confidential with encryption in case of interception of the data. In the wireless LANs, data is encrypted with an encryption key which should be shared by communicating parties. Therefore, an encryption key to be shared is set at client terminals and access points composing a wireless communication system, at the initial setting.

By intercepting and analyzing encrypted data in the communication area of a wireless LAN, the third party may obtain an encryption key which is used in this area. To prevent this happening, an encryption key update system including a key management server being connected to access points in a LAN has been proposed, in which the key management server sends a new encryption key to each access point and wireless terminal when updating an encryption key (for example, refer to Japanese Unexamined Patent Publication No. 2001-111543 (paragraph [0035] to [0041], FIG. 1)). This encryption key update system is capable of improving security by updating an encryption key.

As another system, a wireless communication system has been proposed, in which indexable encryption keys are stored in terminals and access points and an access point sends index information on a selected encryption key to a terminal, so that the terminal can use the encryption key based on the index information (for example, refer to Japanese Unexamined Patent Publication No. 2003-258790 (paragraph [0022] to [0024], FIG. 1)). This wireless communication system is capable of improving security by changing an encryption key.

On the other hand, there has been proposed an authenticating method in a wireless LAN system which can concurrently achieve delivery of an encryption key for maintaining concealment between only communicating parties and an authenticating procedure (for example, refer to Japanese Unexamined Patent Publication No. 2003-5641 (paragraph [0033] to [0037], FIG. 1).). This authenticating method in a wireless LAN system is capable of simplifying second and following authenticating procedures to identify the same access point after releasing the authentication.

The aforementioned first encryption key update system according to Japanese Unexamined Patent Publication No. 2001-111543, however, has a large-scale problem because of the key server which should be installed on a wired LAN to update an encryption key.

Further, the aforementioned second wireless communication system according to Japanese Unexamined Patent Publication No. 2003-258790 has a problem in which the third party may know what encryption key is being used, by intercepting index information which is sent from an access point to a terminal to index an encryption key.

Still further, the aforementioned third authenticating method according to Japanese Unexamined Patent Publication No. 2003-5641 has a problem in which the third party may know an encryption key because the same encryption key is used after the first authentication.

SUMMARY OF THE INVENTION

This invention has been made in view of foregoing and intends to provide a wireless communication system offering an advanced security level without enlarging the system.

The foregoing object and other objects of the invention have been achieved by the provision of a wireless communication system for encrypting and decrypting communication data with an encryption key in wireless communication. This wireless communication system is composed of an access point and a terminal. The access point comprises: an encryption key memory for storing an encryption key list of a plurality of different encryption keys; a change information transmitter for periodically transmitting change information by radio, the change information requesting the change of encryption key which is used for encrypting the communication data; and an encryption key selector for selecting an encryption key from the encryption key list under a rule when the change information is transmitted by radio. The terminal comprises: a terminal-side encryption key memory for storing a terminal-side encryption key list which is the same as the encryption key list; a change information receiver for receiving the change information; and a terminal-side encryption key selector for selecting the encryption key from the terminal-side encryption key list under a rule which is the same as the rule when the change information is received.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows an example of a data structure of the encryption key list.

DESCRIPTION OF THE PREFERRED EMBODIMENTS

Figure 1:
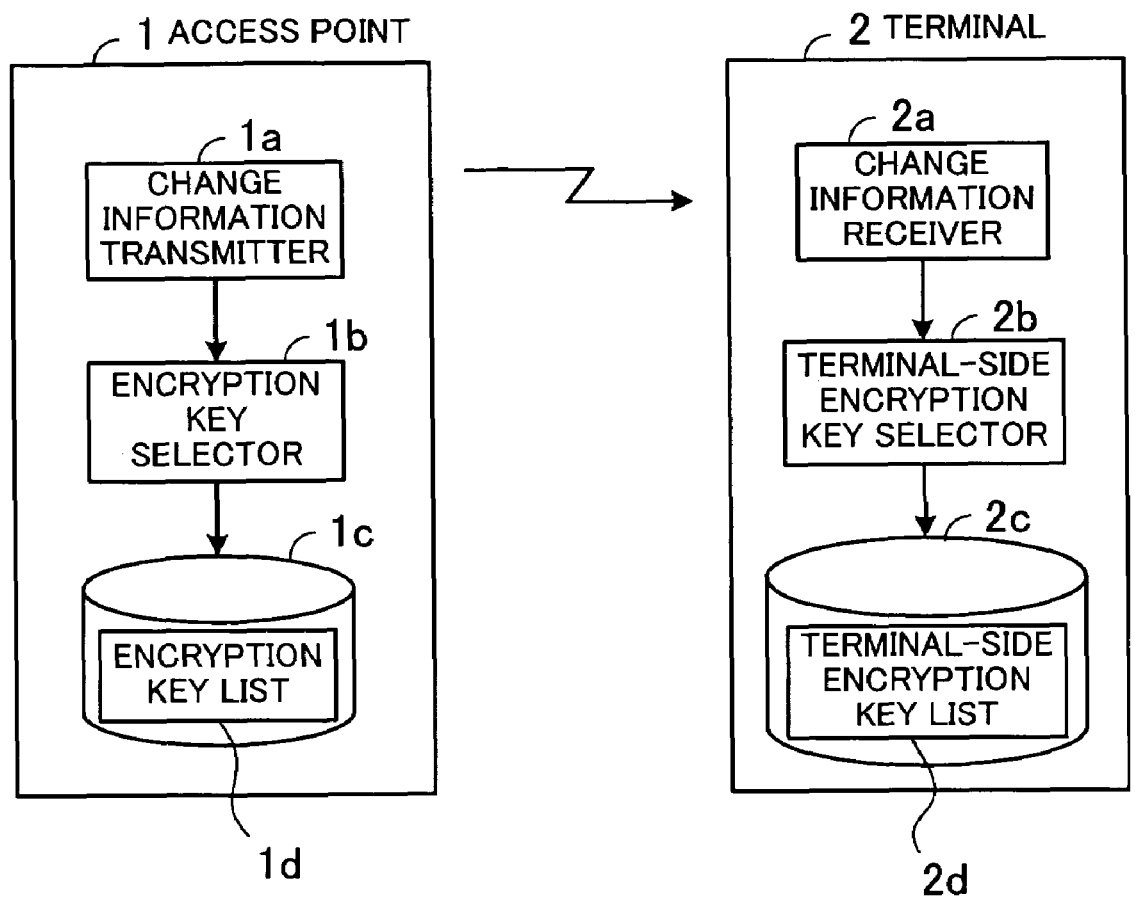
FIG. 1 shows the principle of this invention.

The principle of this invention will be now described with reference to FIG. 1.

Referring to this figure, a wireless communication system is composed of an access point 1 and a terminal 2, in which communication data is encrypted and decrypted with an encryption key in wireless communication. The access point 1 is composed of a change information transmitter 1a, an encryption key selector 1b, and an encryption key memory 1c storing an encryption key list 1d. The terminal 2 is composed of a change information receiver 2a, a terminal-side encryption key selector 2b, and a terminal-side encryption key memory 2c storing a terminal-side encryption key list 2d.

The change information transmitter 1a of the access point 1 periodically transmits change information to the terminal 2 by radio, the change information requesting the change of encryption key which is used for encrypting communication data.

The encryption key selector 1b selects an encryption key from the encryption key list 1d under a rule when the change information transmitter 1a transmits change information to the terminal 2 by radio. For example, this selector 1b selects encryption keys in order from the first key to the last key of the encryption key list 1d.

The encryption key list 1d being stored in the encryption key memory 1c contains a plurality of different encryption keys.

The change information receiver 2a of the terminal 2 receives change information from the access point 1.

When the change information receiver 2a receives the change information, the terminal-side encryption key selector 2b selects an encryption key from the terminal-side encryption key list 2d under a rule which is the same as the rule which the encryption key selector 1b of the access point 1 used to select the encryption key. According to the above example of the encryption key selector 1b, the terminal-side encryption key selector 2b selects encryption keys in order from the first key to the last key of the terminal-side encryption key list 2d.

The terminal-side encryption key list 2d being stored in the terminal-side encryption key memory 2c contains the same encryption keys in the same arrangement as the encryption key list 1d of the access point 1.

Operation of this wireless communication system will be now described.

To change an encryption key being used for encrypting communication data, the change information transmitter 1a of the access point 1 transmits change information requesting the change of the encryption key to the terminal 2.

The encryption key selector 1b selects an encryption key from the encryption key list 1d under a rule when the change information transmitter 1a transmits the change information.

When the change information receiver 2a of the terminal 2 receives the change information, the terminal-side encryption key selector 2b selects an encryption key from the terminal-side encryption key list 2d under the same rule as the encryption key selector 1b. Since the terminal-side encryption key list 2d has the same encryption keys as the encryption key list 1d, the same key is selected.

As described above, the access point 1 and the terminal 2 select the same encryption key from a plurality of encryption keys based on change information requesting the change of encryption key. Since the change information only requests that an encryption key should be changed, the third party cannot know from the change information which encryption key is to be selected, thus improving security. In addition, the access point 1 and the terminal 2 store the encryption key list 1d and the terminal-side encryption key list 2d, respectively, a server to manage encryption keys is not required, resulting in realizing a small-scale system.

Preferred embodiments of this invention will be hereinafter described with reference to the accompanying drawings.

Figure 2:
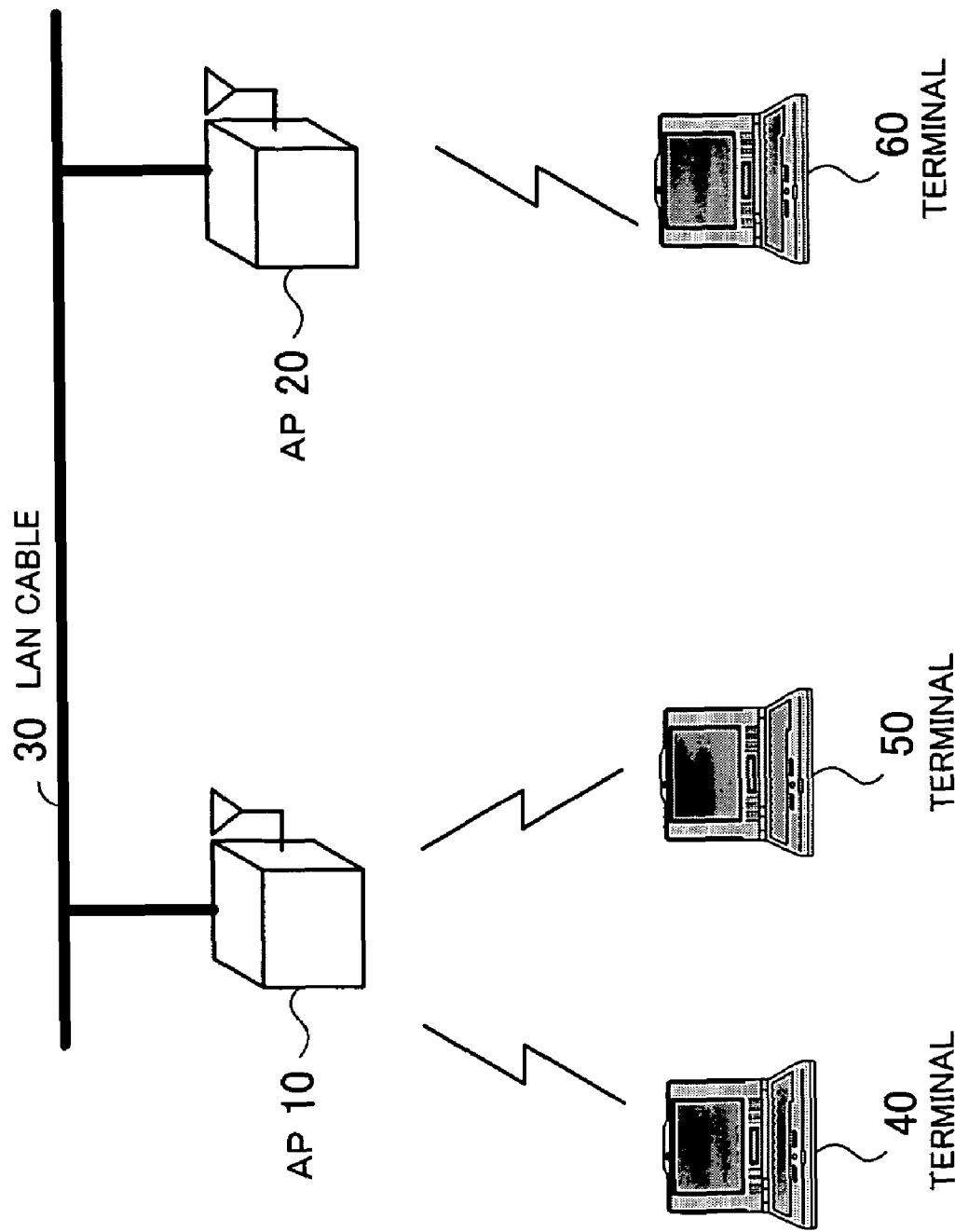
FIG. 2 is an explanatory diagram showing a structure of a wireless communication system of this invention.

FIG. 2 is an explanatory diagram showing a structure of a wireless communication system of this invention.

This wireless communication system shown is constructed with the infrastructure method. Access points (hereinafter, referred to as AP) 10 and 20 are connected to each other with a Local Area Network (LAN) cable 30. Terminals 40 to 60 are personal computers with a wireless communication function, for example. The terminals 40 and 50 can communicate by radio with the AP 10. The terminal 60 can communicate by radio with the AP20. The terminals 40 and 50 can communicate with the terminal 60 via the APs 10 and 20.

In wireless communication between the AP 10 and each terminal 40, 50 and between the AP 20 and the terminal 60, communication data is encrypted with an encryption key in case of third party's decryption of the data. The encryption key is a Wired Equivalent Privacy (WEP) key of the encryption specification defined by the IEEE802.11 standard.

The AP 10 and the terminals 40 and 50 share an encryption key list having a plurality of different encryption keys. Similarly, the AP 20 and the terminal 60 share an encryption key list. The APs 10 and 20 instruct the terminals 40 to 60 to change an encryption key being used as well as changing own encryption key. The AP 10 and the terminals 40 and 50 use the same rule, so as to select the same encryption key from the encryption key list. Similarly, the AP 20 and the terminal 60 use the same rule in order to select the same encryption key.

The APs 10 and 20 periodically update their encryption key lists and sends them to the terminals 40 to 60.

Figure 3:
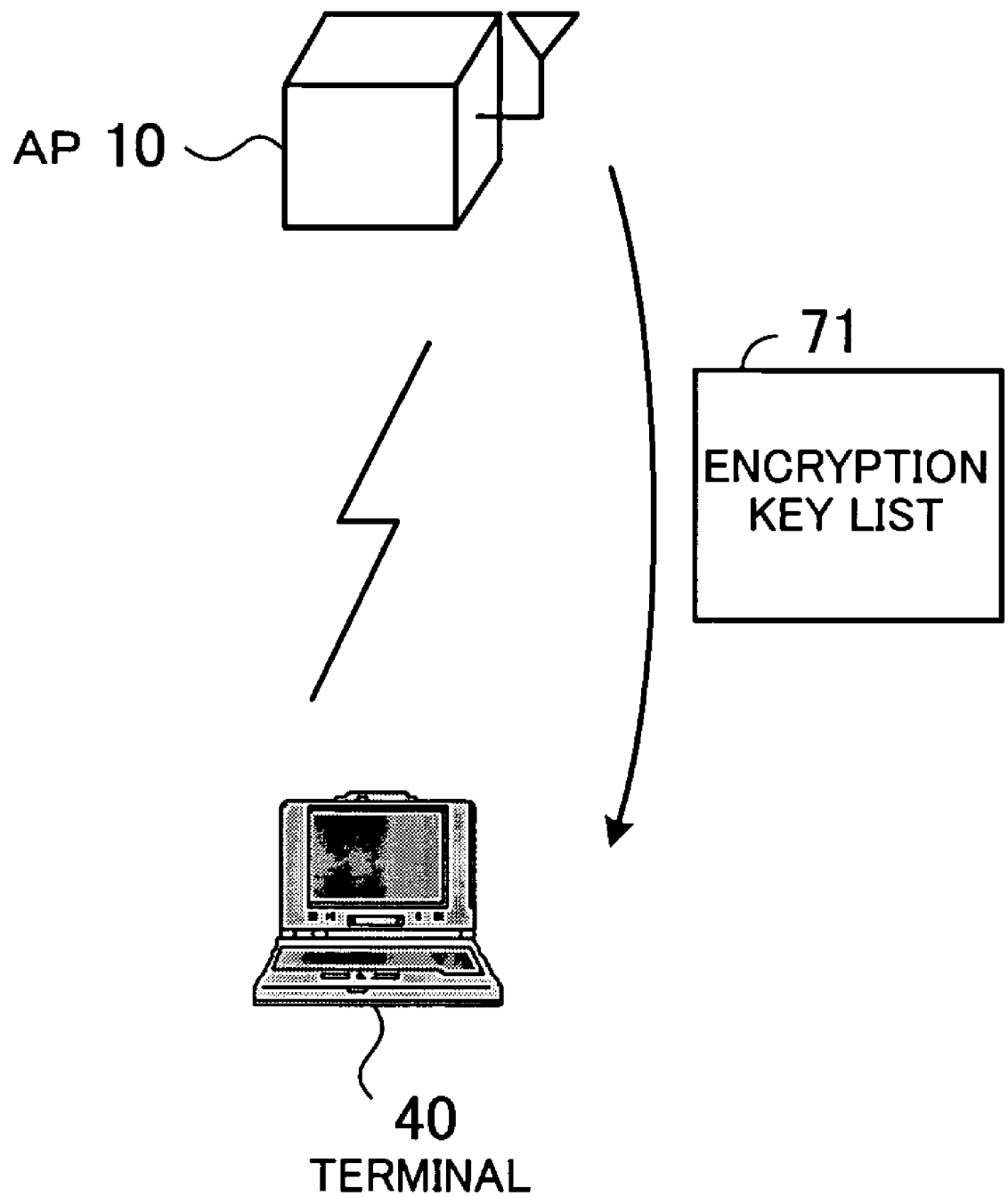
FIG. 3 is a diagram explaining how to update an encryption key list.

FIG. 3 is a diagram explaining how to update an encryption key list.

The AP 10 creates an encryption key list of a plurality of different encryption keys. As shown in this figure, the AP 10 transmits the created encrypted key list 71 to the terminal 40 by radio.

The encryption key list 71 is transmitted when public key authentication is performed between the AP 10 and the terminal 40. In addition, the encryption key list 71 is periodically updated and transmitted to the terminal 40.

Although FIG. 3 shows only the AP 10 and the terminal 40, the AP10 transmits the encryption key list 71 to the terminal 50 as well. Similarly, the AP 20 updates and transmits an encryption key list to the terminal 60.

As described above, an AP and a terminal share an encryption key list of a plurality of different encryption keys and the AP instructs the terminal to change an encryption key. In response to the instruction, the terminal changes the encryption key under a rule which is the same as that used by the AP. Therefore, even if the third party intercepts their wireless communication, he/she cannot know which encryption key is to be used because it is just an instruction to change an encryption key. In addition, the AP periodically updates the encryption key list. This means that an encryption key is periodically changed, with the result that it is hard for the third party to assume an encryption key being used.

Figure 4:
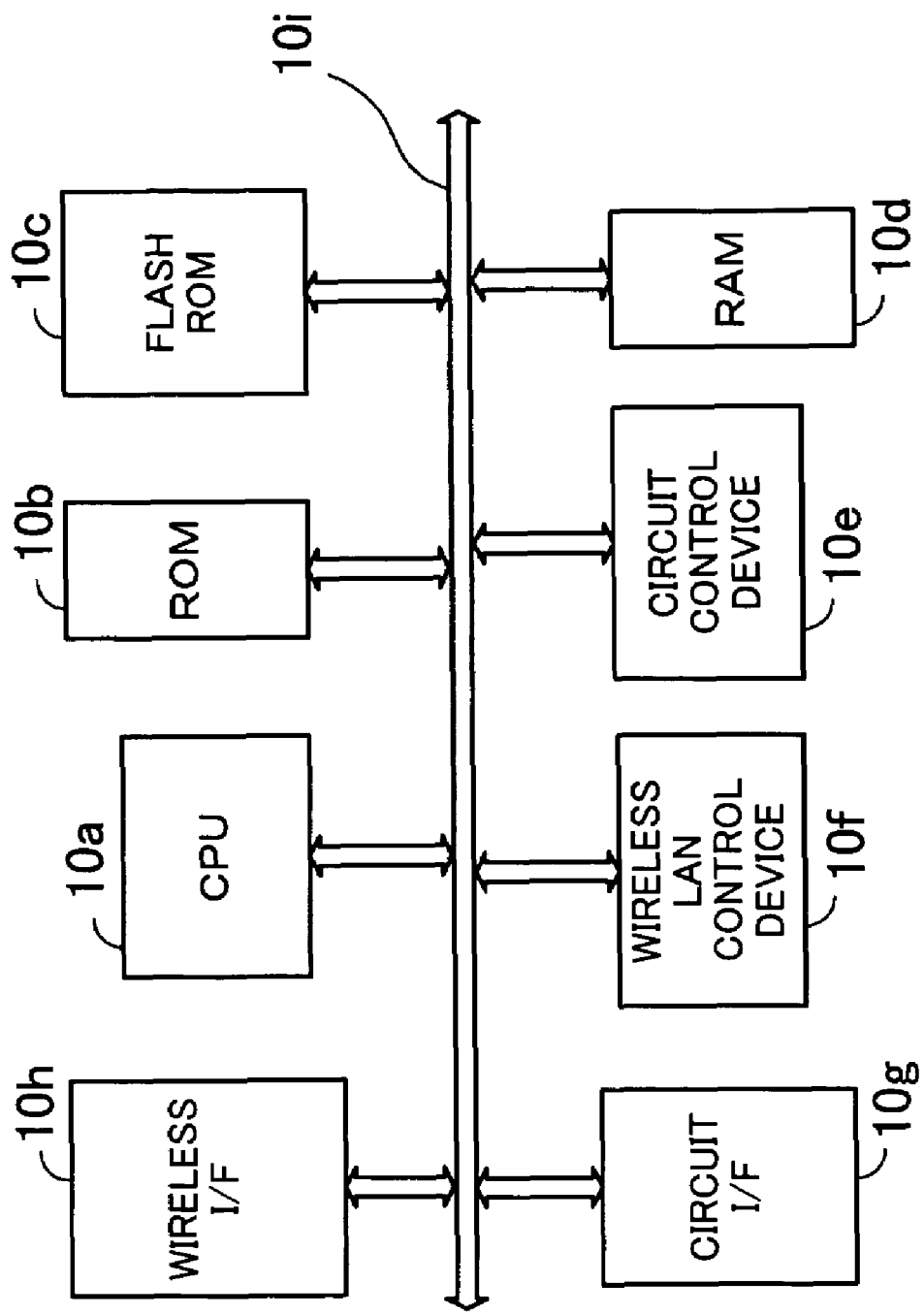
FIG. 4 shows an example of a hardware structure of an access point (AP).

An example of hardware of the AP 10 will be now described with reference to FIG. 4.

As shown in this figure, the AP 10 is entirely controlled by a Central Processing Unit (CPU) 10a. Connected to the CPU 10a via a bus 10i are a Read Only Memory (ROM) 10b, a flash ROM 10c, Random Access Memory (RAM) 10d, a circuit control device 10e, a wireless LAN control device 10f, a circuit interface (I/F) 10g and a wireless I/F 10h.

The ROM 10b stores an operating system (OS) program which is executed by the CPU 10a. The flash ROM 10c stores application programs for communication with the AP 20 and the terminals 40 and 50.

In the RAM 10d, the OS program and application programs are put. In addition, the RAM 10d stores various kinds of data required for the OS program and application programs.

Under the control of the CPU 10a, the circuit control device 10e controls data communication with the AP 20, and the wireless LAN control device 10f controls wireless data communication with the terminals 40 and 50.

The circuit I/F 10g is a circuit interface being connected to the LAN cable 30. The wireless I/F 10h is a wireless interface for communicating radio signals.

With such a hardware structure, the AP 10 can communicate with the AP 20 via the LAN cable 30 and can communicate with the terminals 40 and 50 by radio. Similarly, the AP 20 has the hardware structure as shown in FIG. 4 although its explanation is omitted here.

Figure 5:
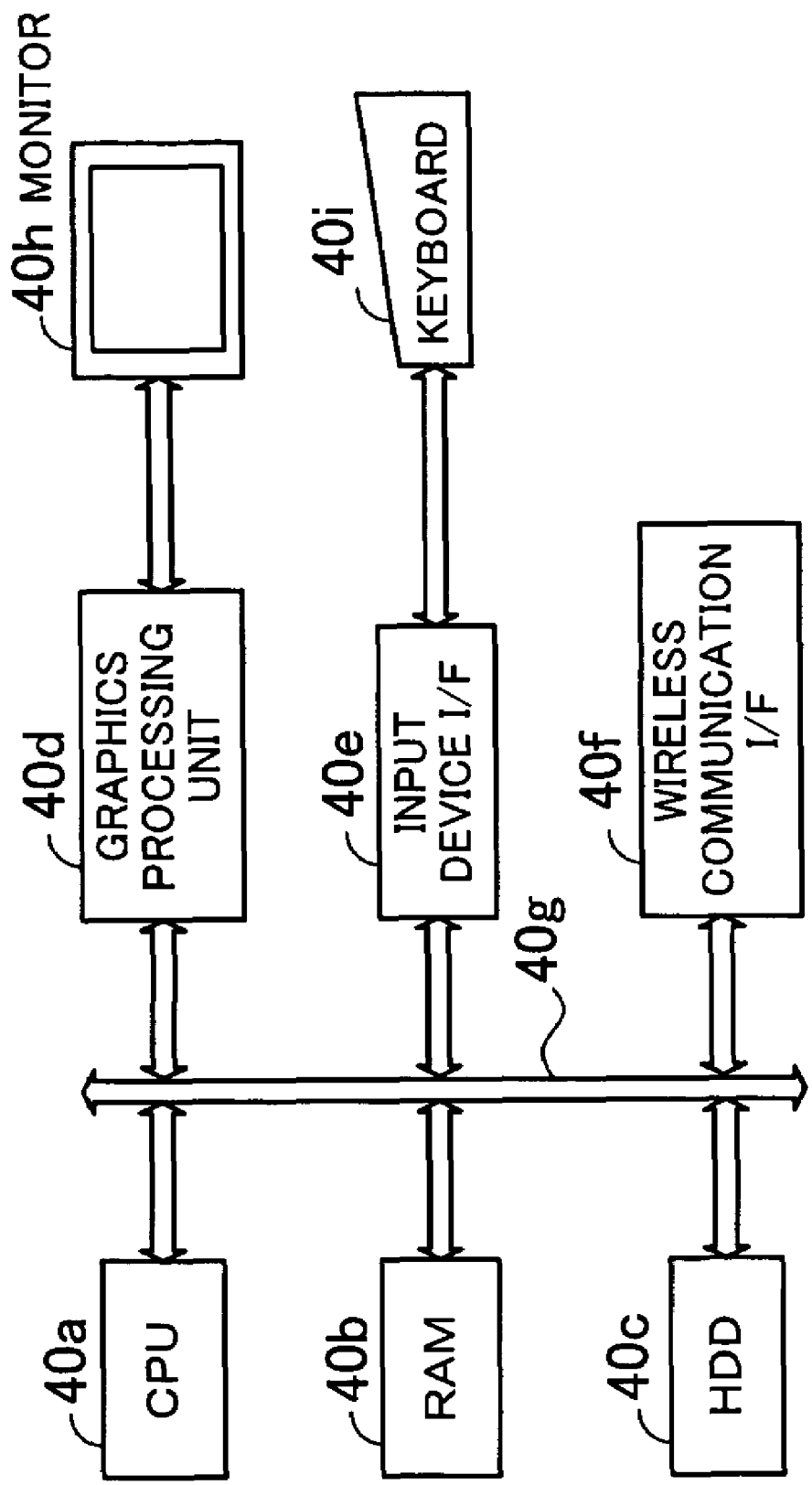
FIG. 5 shows an example of a hardware structure of a terminal.

An example of hardware of the terminal 40 will be now described with reference to FIG. 5.

As shown in this figure, the terminal 40 is entirely controlled by a CPU 40a. Connected to the CPU 40a via a bus 40g are a RAM 40b, a hard disk drive (HDD) 40c, a graphics processing unit 40d, an input device I/F 40e, and a wireless communication I/F 40f.

The RAM 40b temporarily stores at least part of an OS program and application programs for wireless communication with the AP 10, which are executed by the CPU 40a. In addition, the RAM 40b stores various kinds of data required for CPU processing. The HDD 40c stores the OS program and application programs.

The graphics processing unit 40d is connected to a monitor 40h, so as to display images on the display of the monitor 40h under the control of the CPU 40a.

The input device I/F 40e is connected to a keyboard 40i, and transfers signals from the keyboard 40i to the CPU 40a via the bus 40g.

The wireless communication I/F 40f is a wireless interface for wireless communication with the AP 10 under the control of the CPU 40a.

With such a hardware structure, the terminal 40 can communicate with the AP 10 by radio. Similarly, the terminals 50 and 60 have the hardware structure as shown in FIG. 5 although its explanation is omitted here.

Figure 6:
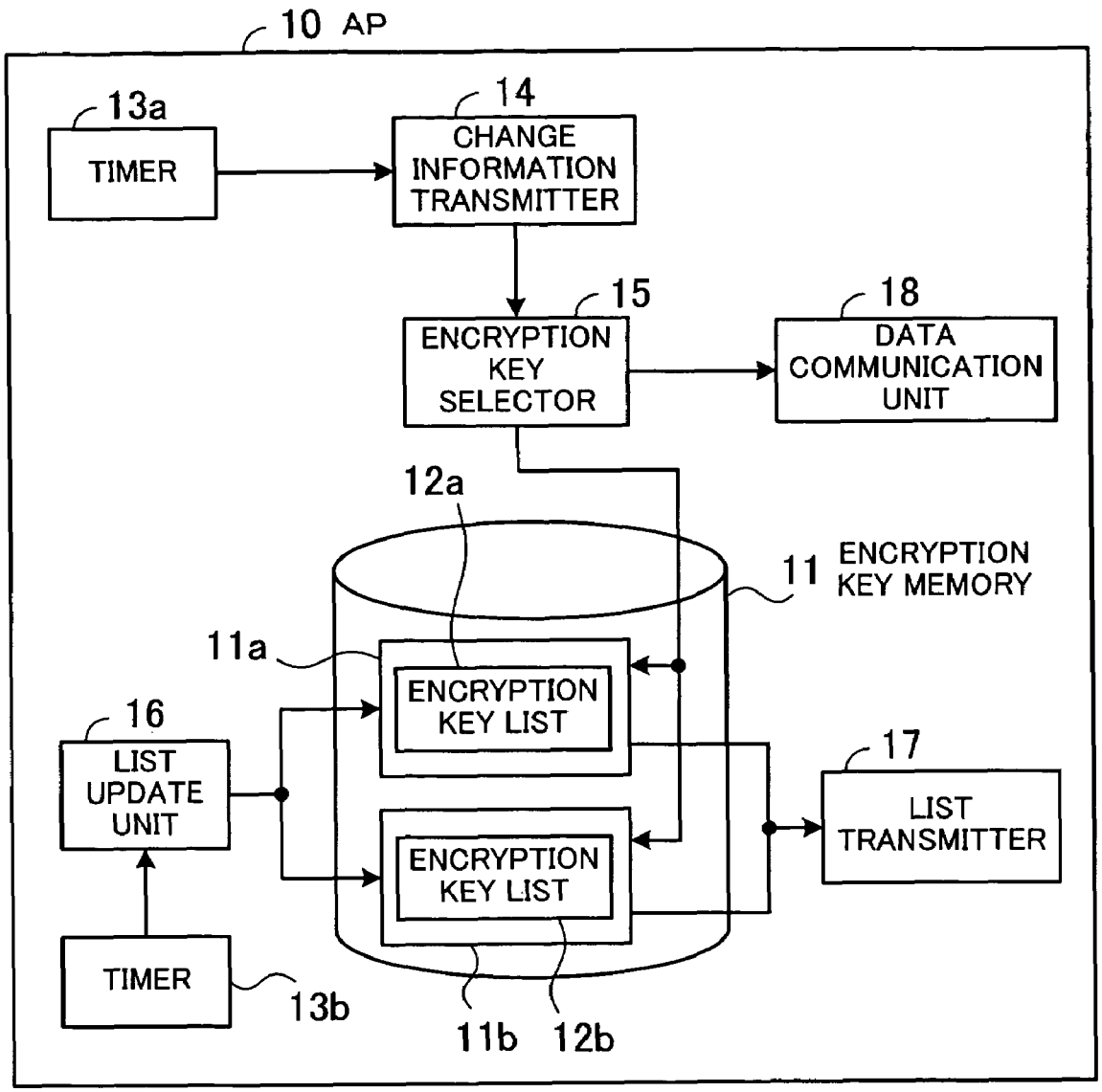
FIG. 6 is a functional block diagram of the AP.

The functions of the AP 10 will be now described with reference to FIG. 6. Note that the AP 20 has the same functions as the AP 10 and its explanation will be omitted.

As shown in this figure, the AP 10 is composed of an encryption key memory 11 storing encryption key lists 12a and 12b, timers 13a and 13b, a change information transmitter 14, an encryption key selector 15, a list update unit 16, a list transmitter 17, and a data communication unit 18.

The encryption key memory 11 has two memory regions 11a and 11b for storing the two encryption key lists 12a and 12b. The encryption key memory 11 is the RAM 10d shown in FIG. 4, for example.

The encryption key lists 12a and 12b each contains a plurality of different encryption keys. One of them is now being used for encrypting communication data while the other is not.

A data structure of the encryption key lists 12a and 12b will be now described with reference to FIG. 7.

As shown in this figure, the encryption key list 12a has a plurality of different encryption keys A1 to A6, . . . The encryption key A1 is arranged as the first key of this list. Then the encryption keys A2 to A6 are arranged in order. Similarly, the encryption key list 12b has a plurality of different encryption keys.

Referring back to FIG. 6, the timer 13a outputs a timer signal to the change information transmitter 14 at preset intervals. The timer 13b outputs a timer signal to the list update unit 16 at preset intervals. The timers 13a and 13b are set to different intervals.

In response to a timer signal from the timer 13a, the change information transmitter 14 transmits change information to the terminals 40 and 50, the change information requesting the change of encryption key for data encryption.

When the change information transmitter 14 transmits the change information to the terminals 40 and 50 by radio, the encryption key selector 15 selects a new encryption key from the encryption key list 12a, 12b being used, under a rule. For example, the encryption key selector 15 selects encryption keys in order from the first key to the last key of the encryption list being used. When the last encryption key has been selected, the first encryption key is selected from the encryption list being used again. In a case where a new encryption key list has been stored in one of the memory regions 11a and 11b, the encryption key selector 15 selects encryption keys in order from the first key to the last key of the new encryption list after the last encryption key of the encryption key list being used. After the last encryption key is selected from the new encryption key list thereafter, the first encryption key of the new encryption key list is selected again.

Upon reception of a timer signal from the timer 13b, the list update unit 16 creates a new encryption key list in one of the memory regions 11a and 11b which does not store the encryption key list 12a, 12b being used. For example, assume that the memory region 11a stores an encryption key list being used. In this case, the list update unit 16 creates a new encryption key list in the memory region 11b. Then a new encryption key list is created in the memory region 11a next time. Note that encryption keys of the new encryption key list are created and arranged at random.

The list transmitter 17 transmits an encryption key list newly created by the list update unit 16, to the terminals 40 and 50 by radio.

With an encryption key selected by the encryption key selector 15, the data communication unit 18 encrypts and transmits communication data to the terminals 40 and 50 by radio, and decrypts communication data received from the terminals 40 and 50.

Figure 8:
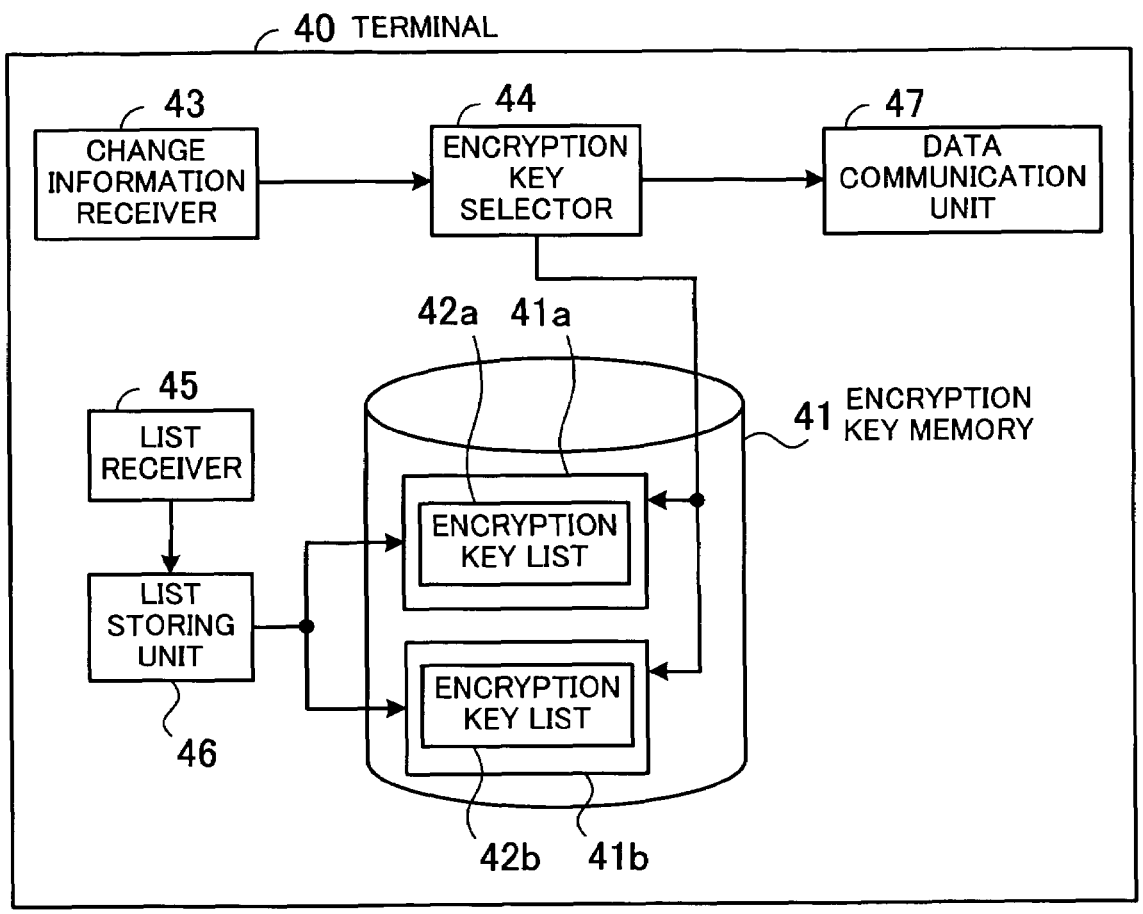
FIG. 8 is a functional block diagram of the terminal.

The functions of the terminal 40 will be now described with reference to FIG. 8. Similarly, the terminals 50 and 60 have the same functions as the terminal 40 and its explanation will be omitted.

As shown in this figure, the terminal 40 comprises an encryption key memory 41 storing encryption key lists 42a, 42b, a change information receiver 43, an encryption key selector 44, a list receiver 45, a list storing unit 46 and a data communication unit 47.

The encryption key memory 41 has two memory regions 41a and 41b for storing the two encryption key lists 42a and 42b. The encryption key memory 41 is the RAM 40b shown in FIG. 5, for example.

The encryption key lists 42a and 42b are the same lists as the encryption key lists 12a and 12b being stored in the memory regions 11a and 11b of the AP 10. Specifically, the encryption key lists 42a and 42b have the same encryption keys in the same arrangement as the encryption key lists 12a and 12b. Note that the terminal 40 is using an encryption key list 42a, 42b corresponding to an encryption key list 12a, 12b being used by the AP 10.

The change information receiver 43 receives change information requesting the change of encryption key, from the AP 10.

When the change information receiver 43 receives change information from the AP 10, the encryption key selector 44 selects an encryption key from an encryption key list 42a, 42b being used, under the same rule as the encryption key selector 15 of the AP 10. Specifically, upon reception of the change information from the AP 10, the encryption key selector 44 selects a new encryption key under the same rule as the encryption key selector 15 of the AP 10, from an encryption key list 42a, 42b containing the same encryption keys as the encryption key list 12a, 12b being used by the AP 10. As a result, the encryption key selector 44 selects the same encryption key as the AP 10.

The list receiver 45 receives a newly created encryption key list from the AP 10.

The list storing unit 46 stores a new encryption key list, which has been received by the list receiver 45 from the AP 10, in a memory region 41a, 41b which does not store an encryption key list being used. As a result, the memory regions 41a and 41b store encryption key lists 42a and 42b containing the same encryption keys as the encryption key lists 12a and 12b being stored in the memory regions 11a and 11b of the AP 10.

With an encryption key selected by the encryption key selector 44, the data communication unit 47 encrypts and transmits communication data to the AP 10 by radio, and decrypts communication data received from the AP 10. The encryption key selected by the encryption key selector 44 is the same key as the one being used by the data communication unit 18 of the AP 10. This enables the AP 10 and the terminal 40 to communicate data with each other.

When the terminal 40 receives change information from the AP 10, it starts a process to select a new encryption key. During this process, the terminal 40 cannot receive communication data even if the AP 10 transmits the data to the terminal 40 by radio. Similarly, while the AP 10 selects a new encryption key, it cannot receive communication data even if the terminal 40 transmits the data to the AP 10 by radio. For this situation, the data communication unit 18 of the AP 10 and the data communication unit 47 of the terminal 40 have a function to keep communication data to be transmitted during the change of encryption key.

This function of the data communication unit 18 to keep communication data will be now described with reference to FIG. 9.

When the change information transmitter 14 transmits change information requesting the change of encryption key, to the terminals 40 and 50 and receives ACKnowledgement (ACK) frames from the terminals 40 and 50, a buffer 81 shown in this figure keeps communication data to be transmitted to the terminals 40 and 50. After the AP 10 receives information indicating completion of the change of encryption key from the terminals 40 and 50 and returns an ACK frame to the terminals 40 and 50, the buffer 81 starts to output the communication data being kept, to a selector 82.

The selector 82 has two inputs. One input directly receives communication data while the other input receives the communication data via the buffer 81. The selector 82 generally outputs communication data directly received. When the change information transmitter 14 transmits change information requesting the change of encryption key to the terminals 40 and 50 and receives ACK frames from the terminals 40 and 50, the selector 82 stops the output of communication data. After the AP 10 receives information indicating completion of the change of encryption key from the terminals 40 and 50 and returns an ACK frame to the terminals 40 and 50, the selector 82 starts to output communication data being kept by the buffer 81. Then the selector 82 outputs communication data directly received.

A WEP encryptor 83 encrypts communication data received from the selector 82, with an encryption key selected by the encryption key selector 15. The encrypted communication data is transmitted by radio to the terminals 40 and 50.

As described above, the data communication unit 18 keeps communication data in the buffer 81 during the change of encryption key. Then after the change of encryption key is completed, the data communication unit 18 transmits the communication data being kept in the buffer 81, to the terminals 40 and 50 by radio. By doing this, the AP 10 and the terminals 40 and 50 can communicate data without fail.

Figure 9:
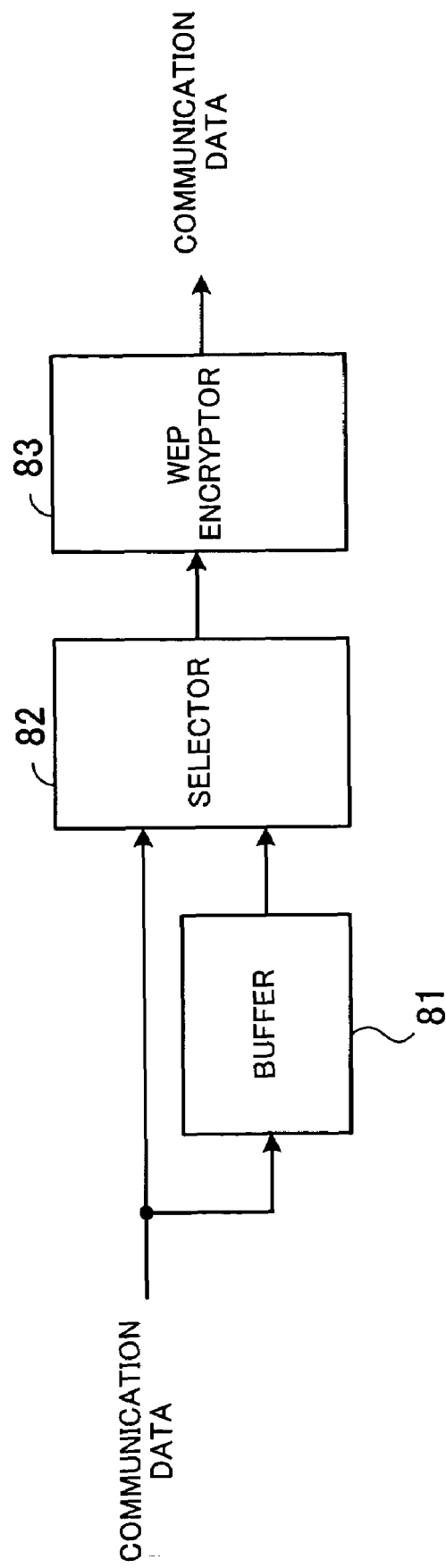
FIG. 9 is a detailed functional block diagram of a data communication unit.

Similarly, the data communication unit 47 of the terminal 40, 50 has the functional block shown in FIG. 9, and keeps communication data to be transmitted to the AP 10 during the change of encryption key.

Figure 10:
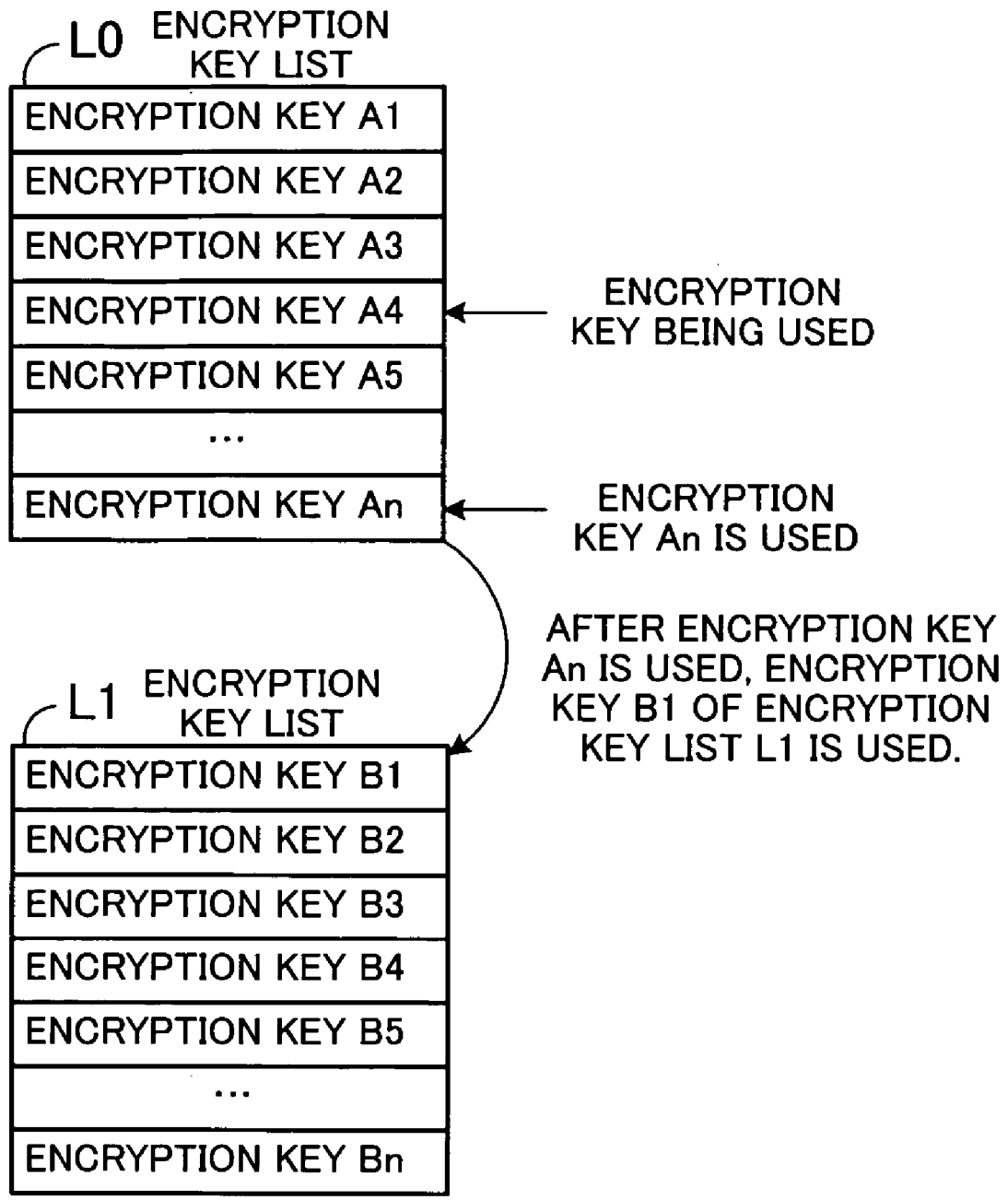
FIG. 10 is a drawing explaining switching of encryption key list.

A method (rule) of switching an encryption key list, which is used for selecting an encryption key, will be described with reference to FIG. 10.

This figure shows encryption key lists L0 and L1. The encryption key lists L0 and L1 have n pieces of different encryption keys A1 to An and B1 to Bn, respectively. Now assume that the encryption key list L0 is now being used and the encryption key list L1 is a newly created encryption key list.

In a case where the new encryption key list L1 is created in the above-described manner, the first encryption key B1 of the encryption key list L1 is selected after the last encryption key An of the encryption key list L0 being used.

Figure 11:
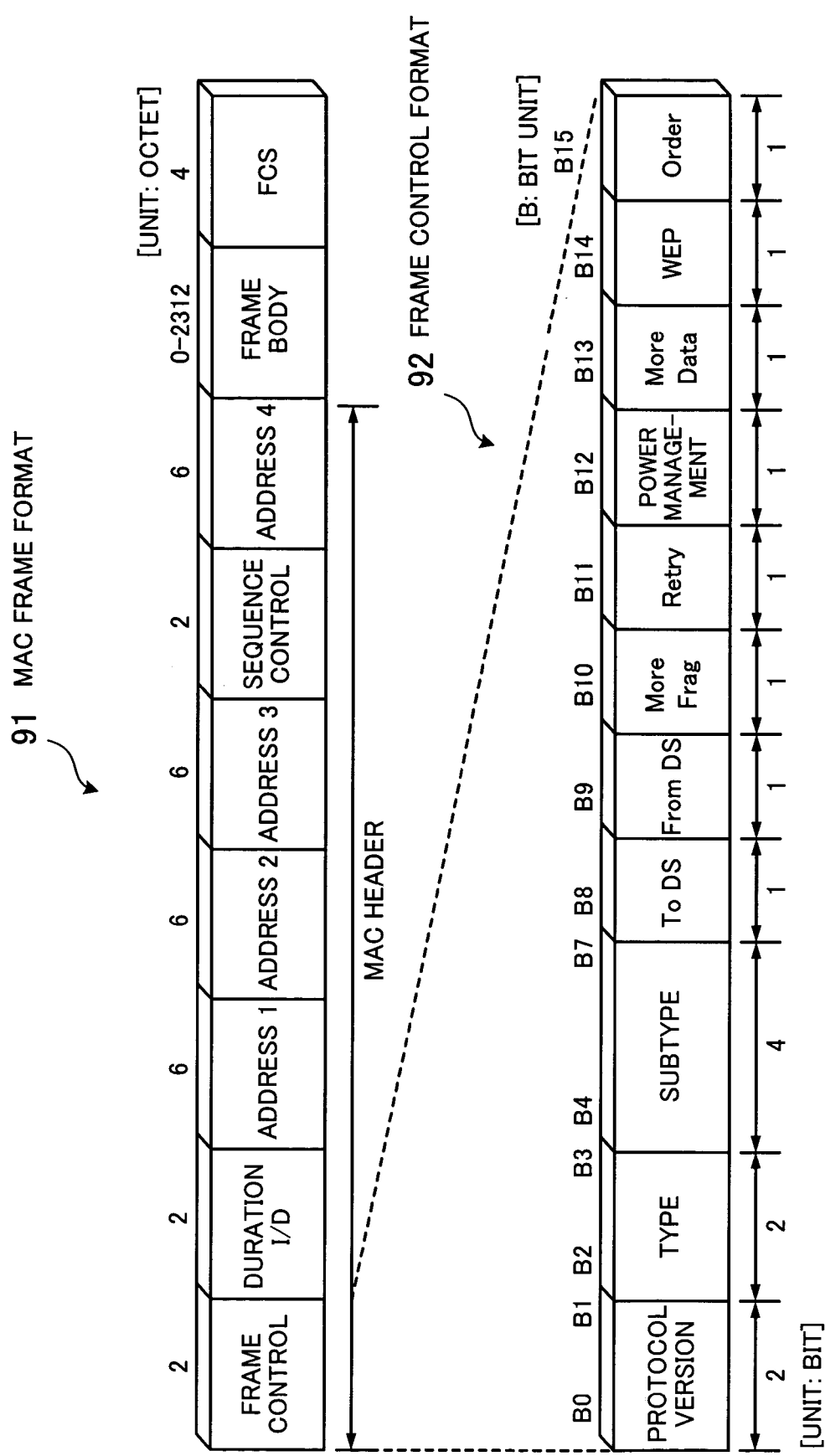
FIG. 11 shows a MAC frame format of communication data.

A MAC frame format of communication data will be now described with reference to FIG. 11.

This figure shows a MAC frame format 91 of communication data and a frame control format 92 detailing the frame control field of the MAC frame format 91.

The MAC frame format 91 is made up of Frame control, Duration/ID, Address 1, Address 2, Address 3, Sequence control, Address 4, Frame body, and Frame Check Sequence (FCS) fields.

The Duration/ID field is used to identify the time μS of using a wireless circuit. The Address fields 1 to 4 contain the MAC addresses of a transmission source and a transmission destination. The Frame body field contains data of the MAC frame. The Sequence control field is used to control the order of MAC frames. The FCS field contains data used to detect data errors.

The frame control format 92 is made up of Protocol version, Type, Subtype, To Distribution System (To_DS), From Distribution System (From_DS), More Fragment (More-Frag), Retry, Power management, MoreData, WEP, and Order subfields.

The Protocol version field is used to indicate the version of the protocol of the MAC frame. The Type and Subtype fields contain information (ACK) responsive to communicated information. The To_DS field is used to indicate whether a receiving station is a base station or a terminal. For example, To_DS is set to "1" when the receiving station is a base station while To_DS is set to "0" when the receiving station is a terminal. The From_DS field is used to indicate whether a transmitting station is a base station or a terminal. From_DS is set to "1" when the transmitting station is a base station while From_DS is set to "0" when the transmitting station is a terminal. The MoreFrag field is used to indicate whether an upper-layered packet should be divided and transmitted. The Retry field is used to indicate whether the MAC frame is a retransmission of a previously transmitted frame. The Power management field is used to indicate whether to monitor power of a terminal. The MoreData field is used to indicate whether there are following packets to be transmitted. The WEP field is used to indicate whether the frame body has been encrypted according to the WEP. The Order field is used to indicate whether this frame is being sent by using strictly-Ordered service class (service class in which an order should not be changed).

In a case of returning an ACK as a response to data communication between the AP 10 and a terminal 40, 50, "01" (B2=0, B3=1) is set in the Type field of the frame control format 92, and "1101" (B7=1, B6=1, B5=0, B4=1) is set in the Subtype field. Therefore, the ACK can be confirmed by checking the Type and Subtype fields of the frame control format 92. For example, assume that the AP 10 sends change information to a terminal 40, 50. The terminal 40, 50 sets "01" and "1101" in the Type and Subtype fields, respectively, of the frame control format 92 as an ACK frame and transmits it to the AP 10. The AP 10 checks the Type and Subtype fields of the frame control format 92 to confirm the reception of the ACK frame responsive to the change information.

Conventionally, ACK information is stored as part of data of an Internet Protocol (IP) frame or a User Datagram Protocol (UDP) frame. Therefore, the data of the IP frame or the UDP frame should be checked to confirm the returning of the ACK. In this embodiment, however, ACK information is stored in the Type and Subtype fields of the frame control format 92 of the MAC frame format 91, so as to simply confirm the returning of the ACK. In addition, time to confirm the ACK can be reduced.

A process to create an encryption key list will be now described with reference to a sequence of FIG. 12.

The AP 10 and the terminal 40 store a new encryption key list under following steps.

At step S1, the timer 13b of the AP 10 is initialized and starts.

At step S2, the list update unit 16 determines whether a time to create an encryption key has come, based on whether this unit 16 receives a timer signal from the timer 13b. Step SP2 is repeated until the timer 13b outputs a timer signal. When the timer 13b outputs a timer signal, on the contrary, the process goes on to step S3.

At step S3, the list update unit 16 creates a new encryption key list.

At step S4, the AP 10 encrypts the newly created encryption key list with a public key.

At step S5, the AP 10 transmits the encrypted encryption key list to the terminal 40.

At step S6, the AP 10 waits for an ACK frame from the terminal 40.

At step S7, the list storing unit 46 of the terminal 40 transmits an ACK frame to the AP 10 in response to the encryption key list which was sent from the AP 10 at step S5.

At step S8, the list storing unit 46 decrypts the received encryption key list with a secret key.

At step S9, the list storing unit 46 stores the encryption key list in a memory region 41a, 41b which does not store an encryption key list being used.

At step S10, upon reception of the ACK frame at step S7, the list update unit 16 of the AP 10 stores the created encryption key list in a memory region 11a, 11b which does not store an encryption key list being used.

The AP 10 and the terminal 40 repeat the above steps to periodically create and update their encryption key lists.

A process to change an encryption key will be now described with reference to FIG. 13.

The AP 10 and the terminal 40 change an encryption key under following steps.

At step S21, the timer 13a of the AP 10 is initialized and starts.

At step S22, the change information transmitter 14 determines whether a time to change an encryption key has come, based on whether the timer 13a outputs a timer signal. Specifically, the change information transmitter 14 repeats step S22 until the timer 13a outputs a timer signal. When the timer 13a outputs a timer signal, the process goes on to step S23.

At step S23, the change information transmitter 14 outputs change information requesting the change of encryption key to the terminal 40.

At step S24, the terminal 40 transmits an ACK frame indicating the reception of the change information to the AP 10.

At step S25, the data communication unit 18 stops communication and keeps communication data to be transmitted, in the buffer 81 as described with reference to FIG. 9.

At step S26, the encryption key selector 15 determines whether an encryption key being used is the last key of the encryption key list 12a, 12b being used. When the encryption key is not the last key, go to step S27; otherwise, go to step S28.

At step S27, the encryption key selector 15 selects a next encryption key from the encryption key list 12a, 12b being used.

At step S28, the encryption key selector 15 determines whether a new encryption key list has been stored in the memory region 11a, 11b which does not store the encryption key list 12a, 12b being used. When yes, go to step S29; otherwise, go to step S30.

At step S29, the encryption key selector 15 selects the first encryption key of the new encryption key list.

At step S30, the encryption key selector 15 selects the first encryption key of the encryption key list being used.

At step S31, the data communication unit 18 changes an encryption key for data encryption, to the encryption key selected by the encryption key selector 15.

At step S32, the data communication unit 47 of the terminal 40 stops communication since it transmitted the ACK frame at step S24, and keeps communication data to be transmitted, in the buffer as described above with reference to FIG. 9.

At step S33, the encryption key selector 44 determines whether the encryption key being used is the last key of the encryption key list 42a, 42b being used. When the encryption key is not the last key, go to step S34; otherwise, go to step SP35.

At step S34, the encryption key selector 44 selects a next encryption key of the encryption key list 42a, 42b being used.

At step S35, the encryption key selector 44 determines whether the encryption key list received from the AP 10 has been stored in the memory region 41a, 41b which does not store the encryption key list 42a, 42b being used. When yes, go to step S36; otherwise, go to step S37.

At step S36, the encryption key selector 44 selects the first encryption key of the encryption key list received from the AP 10.

At step S37, the encryption key selector 44 selects the first encryption key of the encryption key list being used.

At step S38, the data communication unit 47 changes the encryption key for data encryption, to the encryption key selected by the encryption key selector 44.

At step S39, the terminal 40 transmits communication resumption information to the AP 10, the communication resumption information indicating that data can be communicated because the encryption key changing process has been completed.

At step S40, the terminal 40 waits for an ACK frame from the AP 10.

At step S41, the AP 10 transmits an ACK frame to the terminal 40 in response to the communication resumption information which was sent from the terminal 40 at step S39.

At step S42, the data communication unit 18 of the AP 10 transmits communication data being kept in the buffer 81, to the terminal 40, resulting in resumption of communication.

At step S43, the data communication unit 47 of the terminal 40 transmits the communication data being kept in the buffer, to the AP 10 since it received the ACK frame at step S41.

By repeating the above steps, the AP 10 and the terminal 40 change one encryption key after another.

Figure 12:
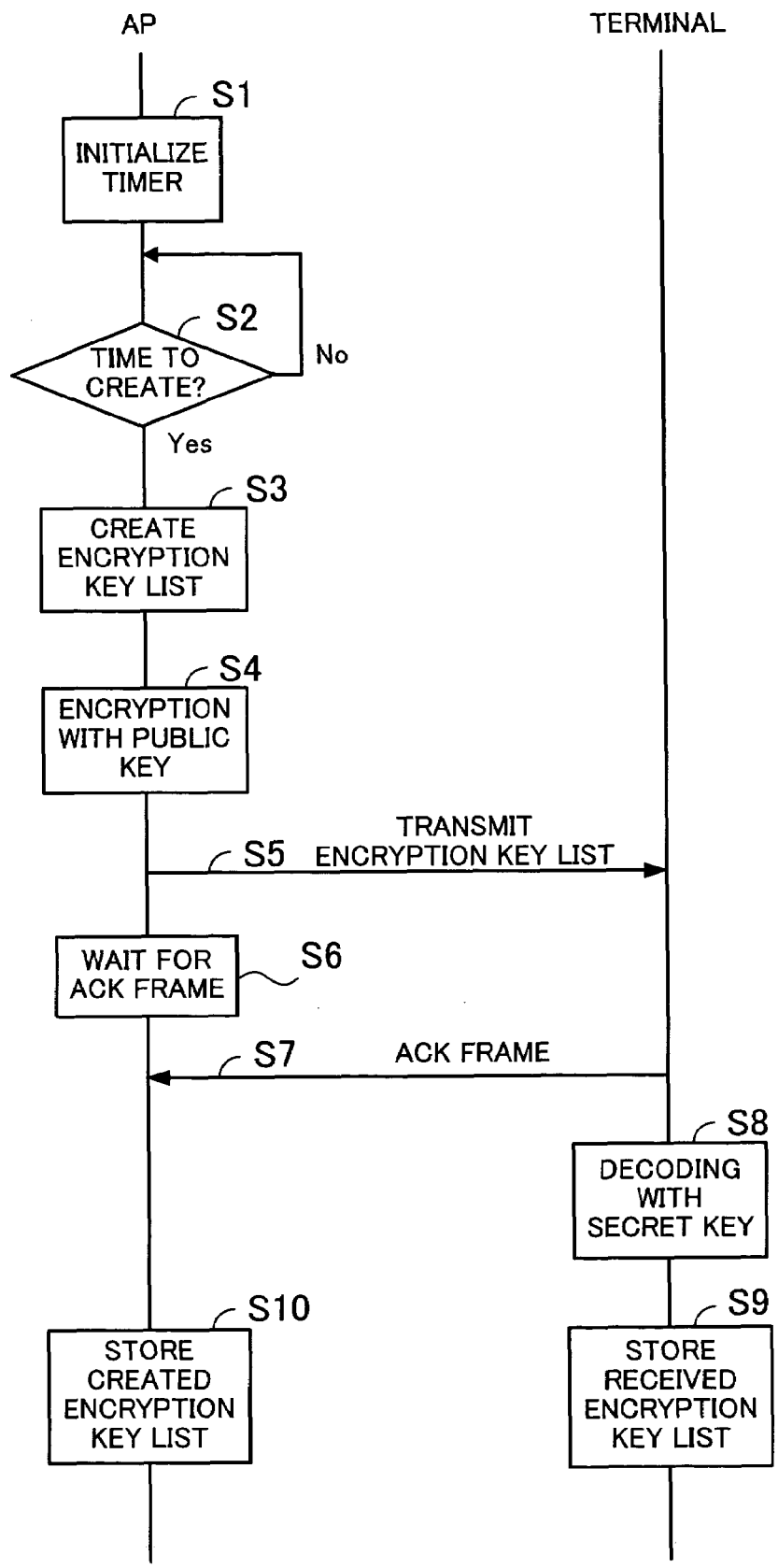
FIG. 12 is a sequence diagram showing a procedure of creation of an encryption key list.
Figure 13:
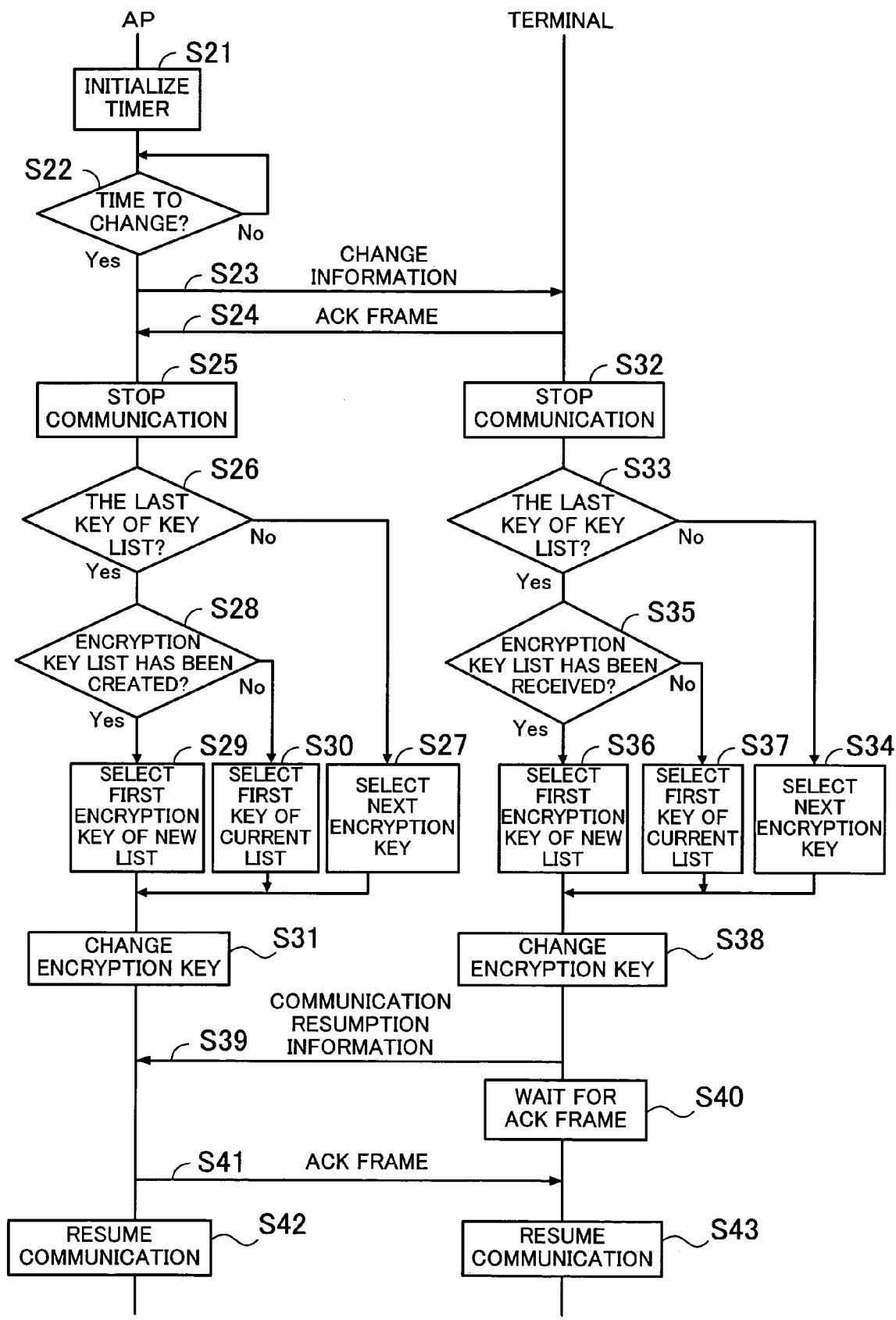
FIG. 13 is a sequence diagram showing a procedure of the change of encryption key.

An ACK frame shown in FIG. 12 and FIG. 13 is stored in the Type and Subtype fields of the frame control format 92 of the MAC frame format 91 and sent, as described above with reference to FIG. 11.

Figure 14:
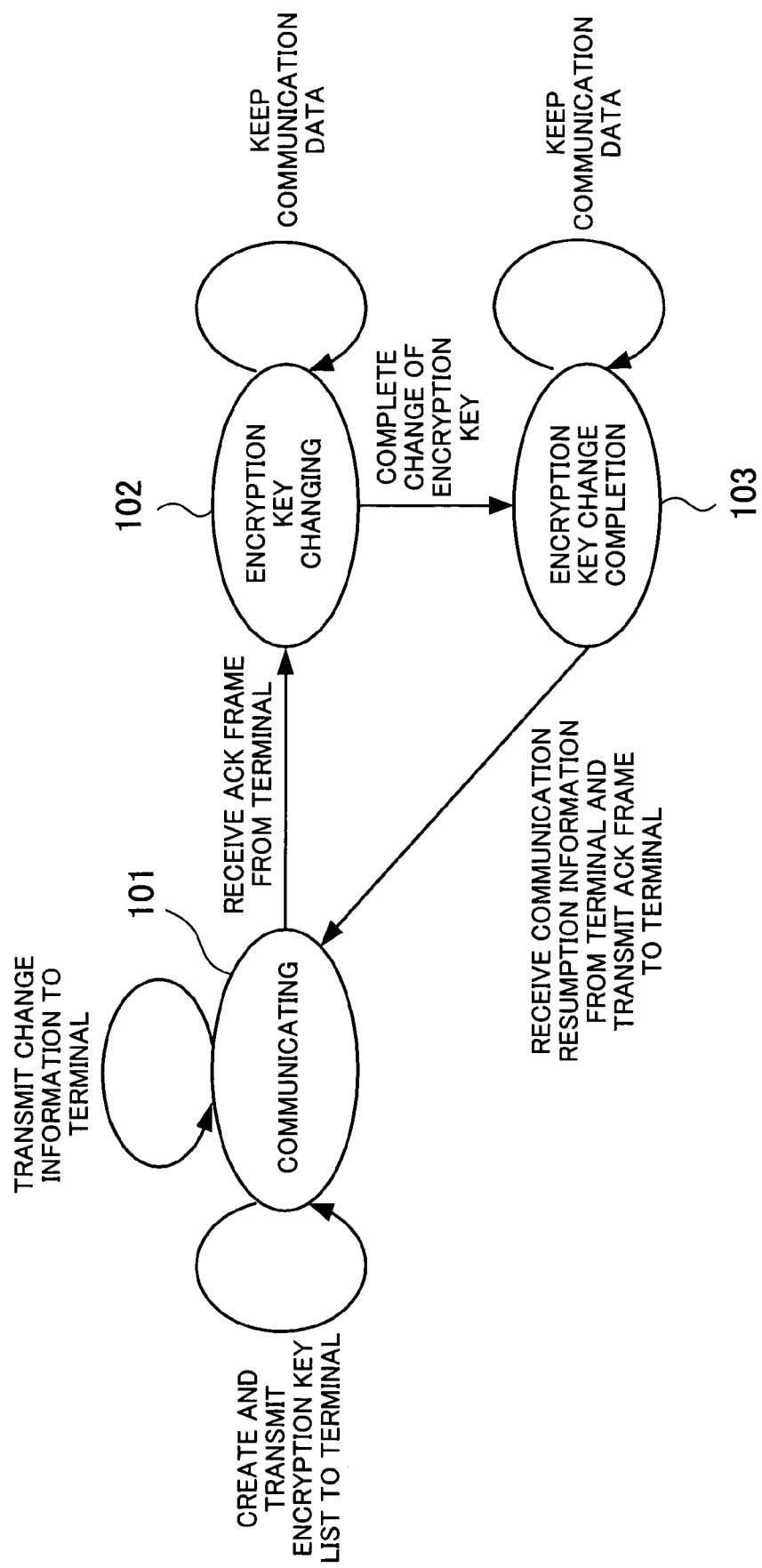
FIG. 14 shows state transitions of the AP.

State transitions of the AP 10 will be now described with reference to FIG. 14.

Communicating 101 in this figure means that AP10 is now communicating data with the terminal 40. Encryption key changing 102 means that the AP 10 is changing an encryption key. Encryption key change completion 103 means that the AP 10 has completed the change of encryption key.

As shown in this figure, in the communicating state 101, the AP 10 creates and transmits a new encryption key list to the terminals 40 and 50 at preset intervals. In addition, the AP 10 transmits change information requesting the change of encryption key, to the terminals 40 and 50 at preset intervals different from those for creation of an encryption key list.

When the AP 10 receives ACK frames from the terminals 40 and 50 in response to a new encryption key list transmitted to the terminals 40 and 50 in the communicating state 101, it stores the new encryption key list in a memory. In addition, when the AP 10 receives ACK frames from the terminals 40 and 50 as a response to change information transmitted to the terminals 40 and 50 in the communicating state 101, it transits to the encryption key changing state 102.

The AP 10 stores communication data to be transmitted to the terminals 40 and 50, in the buffer in the encryption key changing state 102. When the AP 10 finishes the change of the encryption key in the encryption changing state 102, it transits to the encryption key change completion state 103.

When the AP 10 receives communication resumption information from the terminals 40 and 50 in the encryption key change completion state 103, it transmits an ACK frame indicating the reception of the communication resumption information, to the terminals 40 and 50. Then the AP 10 transits to the communicating state 101. Note that the AP 10 stores communication data to be transmitted to the terminals 40 and 50, in the buffer in the encryption key change completion state 103.

Figure 15:
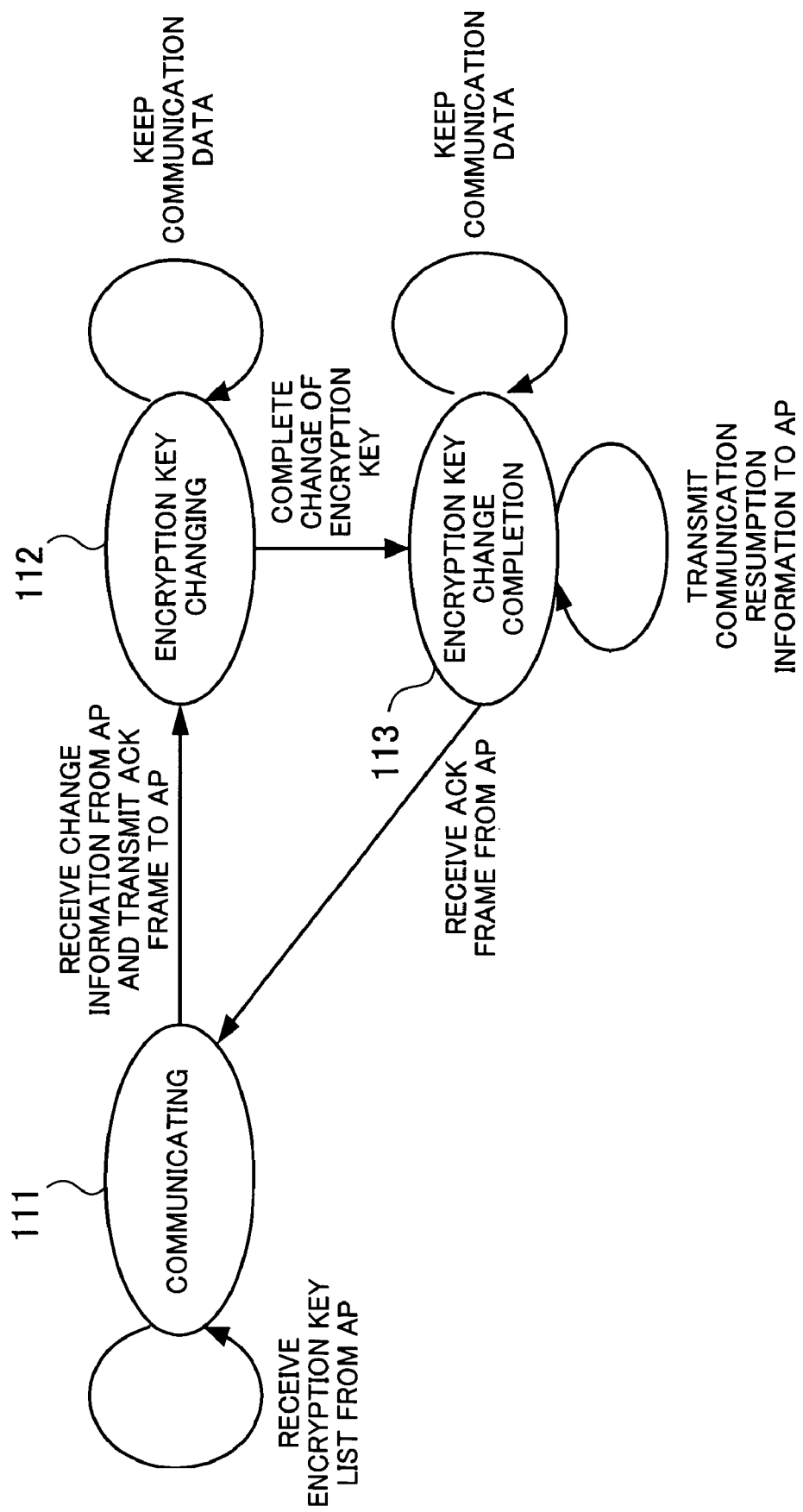
FIG. 15 shows state transitions of the terminal.

State transitions of the terminal 40 will be now described with reference to FIG. 15.

Communicating 111 in this figure means that the terminal 40 is now communicating data with the AP 10. Encryption key changing 112 means that the terminal 40 is changing an encryption key. Encryption key change completion 113 means that the terminal 40 has completed the change of encryption key.

When the terminal 40 receives a new encryption key list from the AP 10 in the communicating state 111, it stores the list in a memory. When the terminal 40 receives change information from the AP 10 in the communicating state 111, it transmits an ACK frame indicating the reception of the change information, to the AP 10 and transits to the encryption key changing state 112.

The terminal 40 keeps communication data to be transmitted to the AP 10, in the buffer in the encryption key changing state 112. The terminal 40 transits to the encryption key change completion state 113 when finishing the change of encryption key in the encryption key changing state 112.

The terminal 40 transmits communication resumption information to the AP 10 in the encryption key change completion state 113. When the terminal 40 receives an ACK frame from the AP 10, it transits to the communicating state 111. Note that the terminal 40 keeps communication data to be transmitted to the AP 10, in the buffer in the encryption key change completion state 113.

As described above, an access point and a terminal select the same encryption key from a plurality of encryption keys based on change information requesting the change of encryption key. The change information just requests that an encryption should be changed, unlike index information specifying an encryption key. As a result, even if the third party intercepts the change information, he/she cannot discover which encryption key is to be selected, thus enhancing security.

In addition, an encryption key list is created and updated so as to periodically change an encryption key. This does not allow an encryption key to be decoded easily, thus enhancing security. Specifically, an encryption key cannot be decoded even with advanced information processing devices such as personal computers.

Still further, an access point updates and stores an encryption key list by itself. This eliminates the necessity of a server to manage encryption keys, thus realizing a small-scale system and cost reduction.

Still further, since two memory regions are provided to store encryption key lists, a newly created encryption key list can be stored in an memory region which is not used, asynchronously with the change of encryption key by using an encryption key list being used. This can realize seamless change of encryption key.

Still further, communication data is temporarily stored in a buffer during the change of encryption key, and then the transmission of the communication data is started after the change is completed. Therefore, data can be communicated without fail.

Still further, an ACK frame as a response to reception of a change signal, an encryption key list and communication resumption information is stored in the Type and Subtype fields of a MAC frame. This simplifies a process to confirm the ACK frame, without a necessity of checking data of an IP frame or UDP frame.

In the wireless communication system of this invention, an access point and a terminal select the same encryption key from a plurality of encryption key based on change information requesting the change of encryption key. Therefore, the third party cannot know from the change information which encryption key is to be used because the information just indicates that an encryption should be changed. This enhances security. In addition, an encryption key list and a terminal-side encryption key list are stored in an access point and a terminal, respectively, thereby realizing a small-scale system.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless communication system for encrypting and decrypting communication data with an encryption key in wireless communication, comprising:
   an access point including:
      an encryption key memory to store an encryption key list of a plurality of different encryption keys;
      a change information transmitter to periodically transmit change information by radio, the change information requesting that an encryption key being used for encrypting the communication data should be changed; and
      an encryption key selector to select the encryption key from the encryption key list under a rule when the change information is transmitted by radio; and
   a terminal including:
      a terminal-side encryption key memory to store a terminal-side encryption key list which is the same as the encryption key list;
      a change information receiver to receive the change information from the access point; and
      a terminal-side encryption key selector to select the encryption key from the terminal-side encryption key list under a rule which is the same as the rule, in response to the change information.

2. The wireless communication system according to claim 1, wherein:
   the access point further including:
      a list update unit to update the encryption key list; and
      a list transmitter to transmit the encryption key list updated; and
   the terminal further including:
      a list receiver to receive the encryption key list updated; and
      a list memory to store the encryption key list received, in the terminal-side encryption key memory means.

3. The wireless communication system according to claim 2, wherein:
   the encryption key memory includes two memory regions; and
   the list update update to store the encryption key list updated, in one of the memory regions which does not store the encryption key list being used.

4. The wireless communication system according to claim 2, wherein:
   the terminal-side encryption key memory includes two memory regions; and
   the list memory to store the encryption key list received, in one of the memory regions which does not store the terminal-side encryption key list being used.

5. The wireless communication system according to claim 1, wherein:
   the access point further includes a data buffer to temporarily to keep communication data to be transmitted, after transmission of the change information; and
   the terminal further includes a terminal-side data buffer to temporarily keep communication data to be transmitted, after reception of the change information.

6. The wireless communication system according to claim 5, wherein:
   the data buffer is to transmit the communication data being kept, after reception of change completion information from the terminal, the change completion information indicating completion of change of the encryption key; and
   the terminal further including:
      a transmitter for transmitting the change completion information; and
      the terminal-side data buffer is to transmit the communication data being kept, after transmission of the change completion information.

7. The wireless communication system according to claim 1, wherein the terminal further including response signal transmission means for storing a response signal in Type and Subtype subfields of a frame control field of a MAC frame and transmitting the MAC frame to the access point, the response signal indicating reception of the change information.

8. An access point for encrypting and decrypting communication data with an encryption key in wireless communication, comprising:
   encryption key memory means for storing an encryption key list of a plurality of different encryption keys;
   change information transmission means for periodically transmitting change information by radio, the change information requesting that an encryption key being used for encrypting the communication data should be changed; and
   encryption key selection means for selecting the encryption key from the encryption key list under a rule when the change information is transmitted by radio.

9. A terminal for encrypting and decrypting communication data with an encryption key in wireless communication, comprising:
   terminal-side encryption key memory means for storing a terminal-side encryption key list which is the same as an encryption key list of a plurality of different encryption keys being stored in an access point;
   change information reception means for periodically receiving change information from the access point, the change information requesting that an encryption key being used for encrypting the communication data should be changed; and
   terminal-side encryption key selection means for selecting the encryption key from the terminal-side encryption key list under a rule which is the same as a rule used by the access point to select the encryption key from the encryption key list, in response to the change information.

* * * * *